Feb. 1, 1927.
J. E. ERCANBRACK
1,616,179
TUBE DISPOSAL IN HEAT TRANSFER APPARATUS
Filed Sept. 7, 1926    2 Sheets-Sheet 2
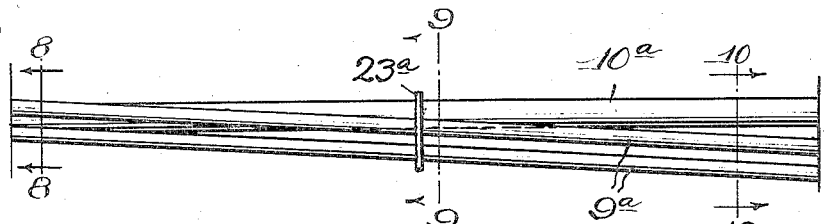
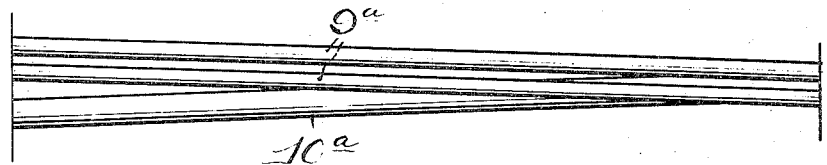
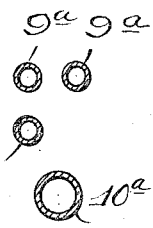
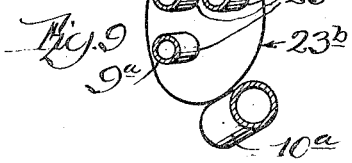
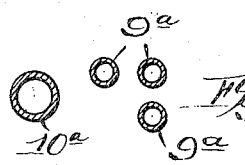
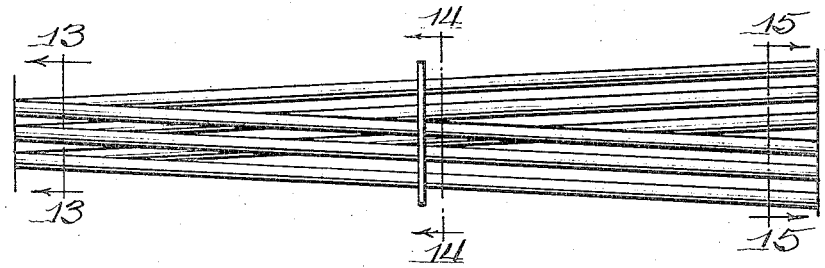
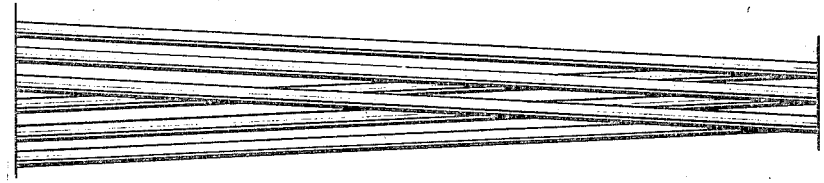
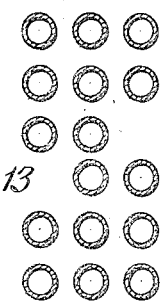
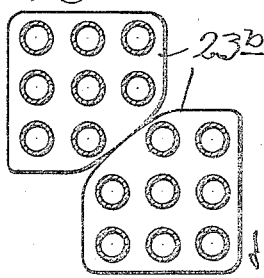
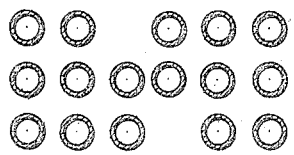

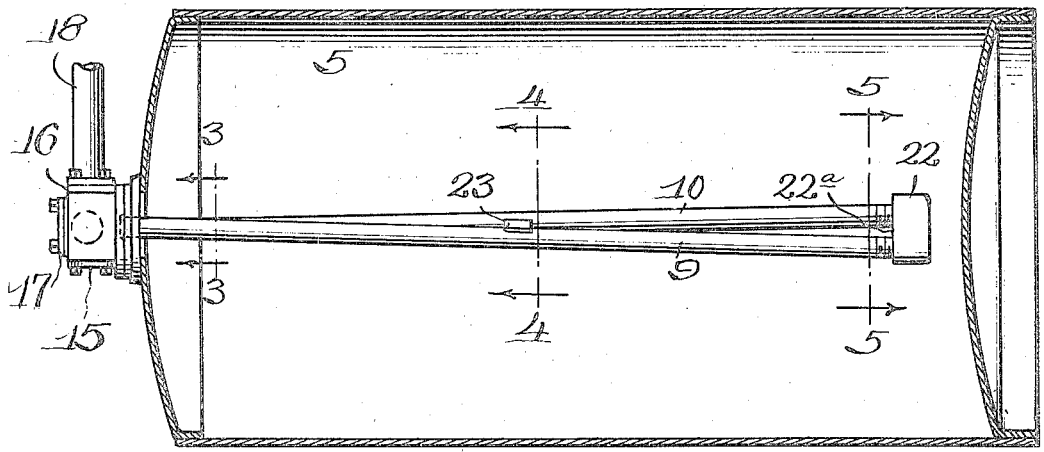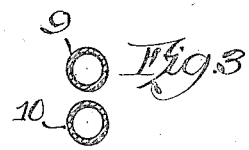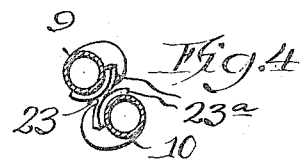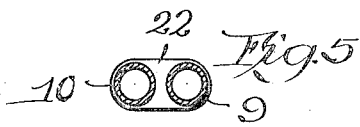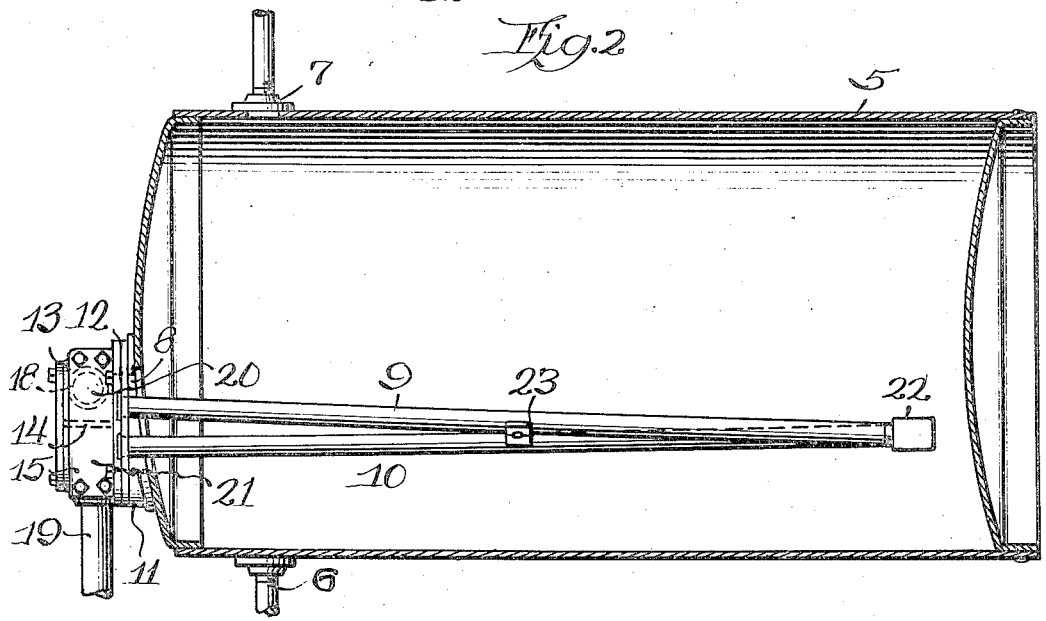

Patented Feb. 1, 1927.

1,616,179

UNITED STATES PATENT OFFICE.

JOHN EDWARD ERCANBRACK, OF CHICAGO, ILLINOIS.

TUBE DISPOSAL IN HEAT-TRANSFER APPARATUS.

Application filed September 7, 1926. Serial No. 133,786.

My present invention relates to improvements in tube disposal in heat transfer apparatus, and has for its objects the control of the pitch of the tubes, the more advantageous disposal of the tubes either for the absorption or radiation of heat, and the reducing and more effective handling of differences of expansion and contraction without greatly altering either the amount or shape of the space occupied by the tubes.

As it well known, the heating of water causes its expansion, thereby decreasing its density and lessening its weight. If there be colder water in the compartment or system of compartments in which the heat is imparted lying above the heated water it will flow downwardly and displace the heated, lighter water upwardly. There are two classes of heat transfer apparatus to which my present invention particularly appertains. Both of these classes involve the employment of tubes included in one circulatory system, which tubes are inclosed within a compartment included within another circulatory system. In one of the classes above referred to the heating water circulates through the tubes, the heat therein being transferred by conduction to the water in the compartment, and in the other class the heating water circulates through the compartment and its heat is transferred by conduction to the water in the tubes. In both classes, however, and in both tubes and compartments the colder, heavier, higher water continually displaces the hotter, lighter, lower water. While this process is continually going on, and, in fact, cannot be prevented, it can, nevertheless, be greatly accelerated by giving to the tubes a suitable pitch and disposition so as to facilitate the circulations both in the tubes and in the compartment.

With respect to the concentration of the tubes, that is, their grouping within a relatively restricted area, it can easily be carried to a point at which conduction is unduly obstructed. The tubes can also be grouped in such a separated and dispersed relation that, while conduction is less affected by adjacent tubes the rate of heat transference for the system as a whole, will not be so great because there well be lesser variations of the temperature, or temperature differential, in different portions of the system. This will be understood by taking into account that the rate of conduction increases with the increase of the difference of temperature between the points where conduction occurs.

A concentrated arrangement is highly desirable as it saves both space and metal, but the most efficient arrangement is that in which, as nearly as possible, a uniform rate of conduction is secured throughout the entire length of the tubes. As will hereafter be seen I attain this condition by grouping the inlet and discharge ends of the tubes in vertical lines in which arrangement the parts of greatest and least conductive efficiency are combined, while the header which joins the upper and lower tubes relate them in horizontal lines.

In cases in which the heating water circulates through the tubes and the water to which the heat is transferred is in the compartment, the water in the tubes, as it gives up its heat, gravitates to the lower point and draws lighter hot water after it. That is, the hot water enters the tube system at the higher point and, of course, at this point, it is the hottest and the difference of temperature between this hottest water and the water to be heated is the greatest and the rate of heat transfer the highest. As the heating water proceeds through the tube it loses its heat until at the point where the tubes leave the compartment, it is coolest.

By bringing back the lower end of the tube directly under the upper or entering end the water in the compartment, heated by the lower tube, rises around the upper end, thereby decreasing the difference of temperature between the entering hot water and the surrounding partially heated water which is to be further heated. This results in a less rate of conduction or heat transference at the point of entry of the heating water so that the heating water reaches the middle and discharge ends of the tube at a higher temperature, thereby increasing the efficiency of the tube as a whole, while diminishing it at the point of its entrance into the compartment.

In the class of cases in which the heating water is contained in the compartment and the water to be heated is circulated in the tubes, the cold water enters the tubes at the lower opening and is surrounded by the heating water which falls as it gives up a part of its heat to the discharge end of the tube. In this case also my arrangement is economical as the water throughout the compartment gives up its heat more uniformly instead of having the heat transference greatly concentrated about the point of entrance of the cold water circulation.

As will hereinafter be seen my arrangement gradually changes the upper and lower tubes from a vertical to a horizontal arrangement, and in this manner, secures a uniform pitch and a slight bending of each pipe, which bending assists the structure in taking care of such differences in expansion and contraction as have not been eliminated by the more uniform temperature maintained throughout the tubes.

In disposing the tubes, as above described, it is necessary to employ a spacer or spreader at their middle portions for otherwise they would be brought into contact to the extent of their bend or twist much as the strands of a rope.

I attain the foregoing objects and results by means of the structure illustrated in the accompanying drawing in which—

Fig. 1 is a central horizontal section through a compartment or tank showing the tubes installed therein in plan, Fig. 2 is a central vertical section through the compartment or tank showing the heating tubes in elevation, Fig. 3 is a section on line 3—3 in Fig. 1, showing the vertical relation of the tubes at their front ends, Fig. 4 is a section on line 4—4 in Fig. 1, in which the spacer is shown in elevation and the relation of the tubes at their mid portion is illustrated, Fig. 5 is a section on line 5—5 in Fig. 1, showing the relation of the tubes at their inner ends.

Fig. 6 is a plan of a tube arrangement in which three upper and a single lower tube are employed, Fig. 7 is an elevation of the structure shown in Fig. 6, Fig. 8 is a section on line 8—8 in Fig. 6 showing the vertical relation of the three upper and single lower tubes at their front ends, Fig. 9 is a section on line 9—9 in Fig. 6 showing the mid relation of the tubes and the spacer in elevation, Fig. 10 is a section on line 10—10 in Fig. 6, showing the relation of the tubes at their rear ends, Fig. 11 is a plan of a grouping of eight upper and eight lower tubes, Fig. 12 is an elevation of the structure shown in Fig. 11, Fig. 13 is a section on line 13—13 in Fig. 11 showing the vertical relation of the upper and lower groups at their front ends, Fig. 14 is a section on line 14—14 in Fig. 11, showing the mid relation of the respective groups and the spacers in elevation, and Fig. 15 is a section on line 15—15 in Fig. 11, showing the relation of the groups at their rear ends.

Similar reference characters refer to similar parts throughout the several views.

The tank, or compartment, 5, shown is of the clyindrical, horizontal type in which are provided inlet fittings, 6, and outlet or discharge fittings, 7. The end of the tank, in the lower portion thereof, is perforated, as at 8, for the admission of the tubes, 9 and 10. To the end of the tank about the aperture 8 is secured in any desired manner, a hollow embossment, 11, to the face of which is bolted a tube plate, 12, and the flange of an exterior casing, 13. The exterior casing is provided with a horizontal, transverse partition, 14, located between the upper and lower tubes, and the vertical sides and front of the exterior casing are closed by plates 15, 16 and 17. The plate 16 is shown as provided with a tapped aperture for receiving the end of pipe 18, and plate 15 is imperforate, but by changing plates 15 and 16 the connection may be made from the opposite side, which, in certain cases, is necessary. In the bottom of the casing 13 is provided a tapped aperture for receiving the pipe, 19 by means of which and pipe 18, the tubes are connected with their circulatory system. The central horizontal partition, 14, in the head, divides the same into the upper compartment, 20, and the lower compartment, 21, and secured in the tube plate, 12, so as to communicate resepectively with the compartments 20 and 21 are the upper tube, 9, and the lower tube, 10. The inner ends of the tubes, 9 and 10, communicate through a header, 22, which spaces the rear ends of tubes, 9 and 10, approximately as far apart as their front ends are spaced by reason of their assembly with the tube plate, 12. The header, 22, may be cast or formed in any desired manner and consists of a hollow casing into one side wall 22ª of which are secured the tube 9 and the tube 10 in horizontal relation.

In rotating the inner header to control the pitch of the upper tube 9 and the lower tube 10, a slight curvature or bow is given the tubes which permits them to expand and contract with less strain upon their points of attachment. To maintain the relative spacing of the tubes with respect to one another, I locate at about their central portions a spacer, 23, consisting of a casting with arms 23ª, extended to partially embrace the respective tubes.

It will be seen that in Figs. 1 to 5 inclusive, is illustrated a device with a length of ingoing and a length of outcoming tubing. Fig. 3 illustrates the vertical arrangement of these tubes at their front ends. Fig. 4 illustrates the manner in which the tubes are slightly bowed at their central portions in order to permit of their front ends being arranged in vertical alignment and their inner ends, as shown in Fig. 5, in horizontal alignment.

In Figs. 6 to 10 inclusive, I have illustrated a tube system consisting of three upper tubes, 9ª, and a single lower tube, 10ª. In this case, as shown in Fig. 9, the spacer consists of a suitable piece of metal, 23ᵇ, perforated at 23ᶜ for the passage of the upper tubes, the edge of the spacer 23ᵇ impinging against the lower tube. Figs. 8 to 10, inclusive, show consecutively the relations of this arrangement of tubes at respectively their front, intermediate and rear ends.

In Figs. 11 to 15, inclusive, I have shown an arrangement consisting of eight upper and eight lower tubes. The spacer in this arrangement consists of two plates, 23ᵈ, perforated for the passage of the tubes, the edges of these plates contacting to keep the two sets of tubes from coming too closely together.

It will be noted that the eight tubes are arranged in a square of three tubes to a side, the tubes at the adjacent corners of the square, when the intermediate relation of the tubes is considered, being omitted.

Fig. 13 shows the relation of this grouping at its front end, Fig. 14 at its intermediate portion and Fig. 15 illustrates the horizontal disposition of the upper and lower groups at the inner ends of the tubes. In cases where a plurality of tubes is used in place of a single tube, the general operation of the upper and lower groups are the same as with a single tube, although there are entirely different conditions developed by the reaction of the tubes between each other. The grouping, as illustrated in Figs. 11 to 15, inclusive, is what may be described as concentrated, in which class of cases my manner of disposition is peculiarly advantageous.

Having described my invention what I claim as new and desire to secure by Letters Patent is—

1. In a heat transfer apparatus consisting of a plurality of tubes included in one circulatory system and a compartment enclosing said tubes, said compartment being included in an independent circulatory system, the disposal of said tubes in vertical alignment at their entering and discharge ends and in horizontal alignment at their inner communicating ends.

2. In a heat transfer apparatus consisting of a plurality of tubes included in one circulatory system and a compartment enclosing said tubes, said compartment being included in an independent circulatory system, the disposal of said tubes in vertical alignment at their entering and discharge ends and in horizontal alignment at their inner communicating ends and means for spacing said tubes intermediate their lengths.

3. In a heat transfer apparatus consisting of a plurality of tubes included in one circulatory system and a compartment enclosing said tubes, said compartment being included in an independent circulatory system, the disposal of said tubes in vertically aligning groups at their entering and discharge ends and in horizontal alignment at their inner communicating ends.

4. In a heat transfer apparatus consisting of a plurality of tubes included in one circulatory system and a compartment enclosing said tubes, said compartment being included in an independent circulatory system, the disposal of said tubes in vertically aligning groups at their entering and discharge ends and in horizontal alignment at their inner communicating ends and means for spacing said tubes intermediate their lengths.

JOHN EDWARD ERCANBRACK.